United States Patent [19]

Gros

[11] 4,384,905

[45] May 24, 1983

[54] METHOD OF FORMING AN INSULATING PIPE

[76] Inventor: René Gros, La Madone, Saint Pierre de Chandieu, Rhone, France

[21] Appl. No.: 251,013

[22] Filed: Apr. 3, 1981

[30] Foreign Application Priority Data

Apr. 8, 1980 [FR] France ................................ 80 07883

[51] Int. Cl.³ ............................................. B29D 27/04
[52] U.S. Cl. ........................................ 156/79; 29/460; 156/294; 156/330; 264/45.5; 264/46.5; 264/46.9; 264/DIG. 13
[58] Field of Search ...................... 264/46.9, 46.5, 45.5, 264/DIG. 13; 29/460; 156/79, 294, 330

[56] References Cited

U.S. PATENT DOCUMENTS

| | | | |
|---|---|---|---|
| 2,857,931 | 10/1958 | Lawton | 264/46.5 X |
| 3,289,704 | 12/1966 | Nicosia | 264/46.9 X |
| 3,380,258 | 4/1968 | Young | 264/46.5 X |
| 3,480,493 | 11/1969 | Bauer et al. | 264/46.5 X |
| 3,491,171 | 1/1970 | French | 264/46.5 |
| 3,685,546 | 8/1972 | Sigmund | 264/46.9 X |
| 3,935,632 | 2/1976 | Maxson | 264/46.9 X |
| 3,949,461 | 4/1976 | Thastrup | 264/46.9 X |
| 4,009,732 | 3/1977 | Martin et al. | 264/46.5 X |
| 4,049,480 | 9/1977 | Kutschke | 264/46.5 X |
| 4,073,841 | 2/1978 | Dültgen et al. | 264/46.9 X |

*Primary Examiner*—Philip E. Anderson
*Attorney, Agent, or Firm*—Remy J. VanOphem

[57] ABSTRACT

The thermally insulated conduit includes an internal pipe, an external pipe, and an insulating foam which fills the interspace formed between these pipes. An electric grid, consisting of a wire heater, extends through the tubular space and is attached to the outer periphery of the internal pipe. The insulating foam used is made from a base of epoxy resins which are polymerized and hardened by an exothermic chemical reaction. The electric grid is used to heat the fluid contained in the internal pipe when the conduit is operated.

9 Claims, 8 Drawing Figures

METHOD OF FORMING AN INSULATING PIPE

FIELD OF THE INVENTION

The present invention pertains to a method of insulating pipes as well as to the product obtained by using this method and more specifically, the invention relates to the thermal insulation of the pipes by inserting an insulating substance inside a tubular space which is limited by an internal pipe designed for the circulation of a fluid, and by an external pipe concentric with the internal pipe.

BACKGROUND OF THE INVENTION

One of the known prior systems of insulating pipes requires the use of polyurethane foam and has the following disadvantages:

The heater is very sensitive to the humidity. If humidity infiltrates the insulating substance, an hydrolysis occurs. This chemical reaction is followed by release of hydrochloric acid which may affect the foam support, namely the pipes themselves.

The insulation thus obtained by this prior art system is also affected by heat and cannot be used at temperatures exceeding 90° or 100° C.

The use of such a process involves the emission of chemical substances that may be very hazardous to the people and thus generates labor problems.

Considering the possible variation of the volume of foam obtained from the initial foam generating substance, and the fact that this volume of foam is dependant upon the ambient temperature, the foam may generate a high pressure around the walls of the pipes, and that pressure may be detrimental to these pipes.

It is impossible to design fittings that would provide good seal with the insulation. In addition, fittings and couplings are expensive and require a significant amount of work for their installation. Besides with time, the seal of the insulation with the fittings will deteriorate.

The thermomechanical properties of polyurethane foam is rated very low, and therefore it is inferior to the thermomechanical properties of epoxy foam.

In any case, the average life of the conduits thus obtained does not exceed 5 to 6 years.

SUMMARY OF THE INVENTION

The pipe insulating method designed according to the specifications of the present invention consists of the introduction of an insulating substance into a tubular space between two concentric pipes. This insulating method is further characterized by the fact that an epoxy resin foam is injected into the said tubular space.

According to another specification of the invention, and in the event that the concentric pipes are straight, the foaming substance is injected at the bottom of the tubular space while the pipes are maintained in a slanted position.

According to another specification of the invention, and before the foaming substance is injected, radial spacers are randomly placed between both pipes so as to maintain an equal distance between the respective walls of the concentric pipes, and a heating wire is also inserted therein.

According to another specification of the invention, two insulated portions of pipes are coupled in the following manner:

The ends, of each internal pipe with an insulated piping portion, are directly welded together with the end of each of the pipes extending beyond the insulating foam. The empty space separating both insulating portions of foam is surrounded by a plastic sleeve which includes a longitudinal slot. Both ends of the sleeve also overlap a short portion of the external pipes of each of the insulated piping portions. The installation of this sleeve is permitted by an enlargement of the slot following a temporary elastic distortion of the sleeve. Since the slot is directed toward the top, it is used for the injection of a certain quantity of epoxy foam inside the sleeve.

The resultant insulated piping portion is characterized by the fact that it includes two concentric pipes having a limited interspace therebetween filled with an epoxy foam.

According to another specification of the invention, the tubular interspace also includes a wire heater which maintains the fluid circulating inside the internal pipe at a constant temperature.

According to another specification of the invention, the internal pipe extends beyond the external pipe and beyond the insulating foam at each end of the piping portion.

BRIEF DESCRIPTION OF THE DRAWINGS

The attached drawings will give a better understanding of the invention.

DESCRIPTION OF THE PREFERRED EMBODIMENTS

Figure 1:
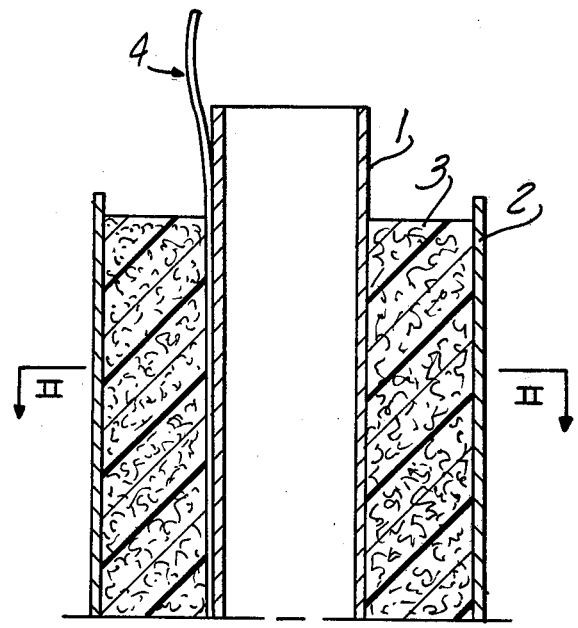
FIG. 1 shows a longitudinal cross-sectional view of an insulated portion of pipe obtained by the invented system.
Figure 2A:
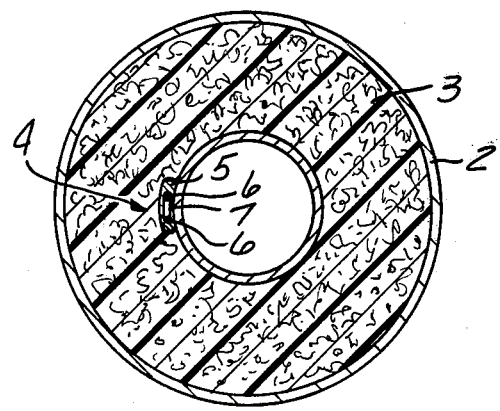
FIG. 2A is a cross-sectional view along lines II—II of FIG. 1.
Figure 2B:
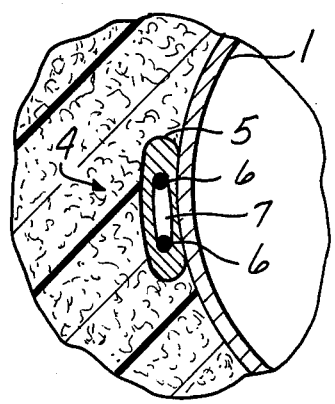
FIG. 2B is an enlarged view of a portion of FIG. 2A.

As illustrated on FIGS. 1 and 2, the invention concerns a system or method for insulating conduits. The invention includes an internal pipe 1, an external pipe 2 and an insulating foam 3 which fills the tubular space between these pipes.

The pipes 1 and 2 may be made of plastic, such as PVC, whereas the foam 3 consists of an epoxy resin. Pipe 1 is used for the circulation of a fluid, whereas pipe 2 protects the insulating foam 3 against any attack or etching.

An electrical wire or grid 4, consists of a heating wire which extends to the immediate vicinity of internal pipe 1 and inside the tubular space. This wire may be used to heat the fluid contained in the internal pipe when the conduit is being used. The fluid may therefore be heated or kept at a maximum temperature of about 160° C. This may apply, for instance, to heavy fuel oil which should be kept at a constant temperature of 60° C.

It is of course possible to use various types of electric resistances for the wire 4. In the selected example, the wire includes two metal wires 6 that are placed on either side of a resistant tape 7 inside a flat insulating sheath 5. The resistant tape 7 is made of carbon loaded neoprene, and its temperature rating may be either positive or negative.

Figure 3:
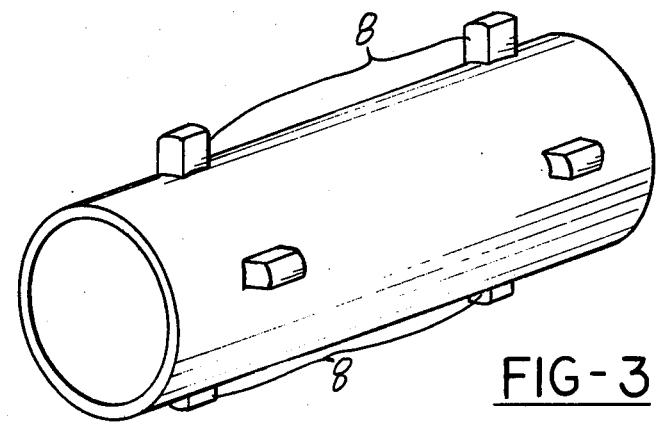
FIG. 3 is perspective view of the internal tube of the piping portion, before injecting the foam thereon.
Figure 4:
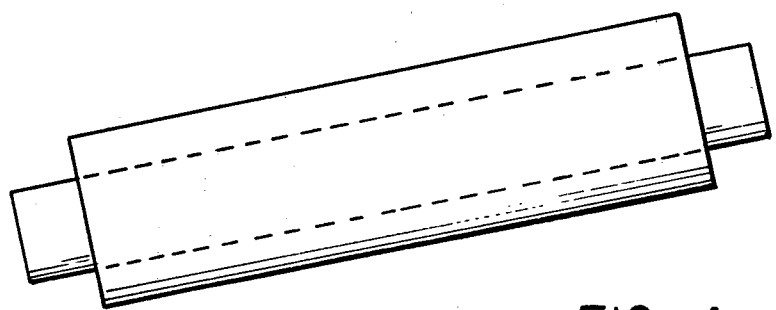
FIG. 4 is a side view illustrating the invented system.

According to the invention, the insulated conduits are obtained in the following manner:

Each insulated portion of pipe is prepared by installing randomly around internal pipe 1, a series of radial spacers 8 as shown in FIG. 3. The internal pipe is then inserted inside the external pipe 2. The spacers maintain an equal distance between the walls of the concentric pipes. The electric wire or grid 4 is also installed during this operation. The pipes are then tilted as shown in FIG. 4, and the epoxy resin foam generator is inserted inside the tubular space from the bottom. The injection is made at a high rate, about 400 grams per second, and very quickly; it takes about fifteen seconds at most. The product, which is very viscous, immediately sticks to the walls and reacts after a few seconds under the effect of the heat released by an exothermic reaction. A polymerization of the foam occurs shortly thereafter, and the foam becomes hard after approximately 3 minutes. The pressure applied by this foam is relatively low, about 2 bars. Given the low pressure applied to the walls of the pipes, the pipes are unlikely to become distorted.

In order to improve the quality of the foam and to minimize the skin effect occuring during the foaming, it is possible to heat the internal tube at an approximate temperature of 80° C. through hot water circulation. By avoiding the skin effect during the foaming process, and due to the fact that the skin is made of pure resin, a significant quantity of material can be saved while improving the thermic insulation.

The quality of the foam may also be improved by the injection of an inert gas, such as nitrogen or argon, by the machine performing the distribution of the foam generating substance, and during the foaming operation. This gas injection produces two effects. First, it allows for a "nucleation" of the product by increasing the number of closed cells at the expense of the interpenetrating cells, thus providing a better thermic insulation. Second, the foam density may be decreased, and significant savings results from the reduced consumption of epoxy resins.

The advantages of the invented system become more apparent when comparing it to a prior art system calling for the use of polyurethane foam. This prior art system requires a much longer reaction time, since a relatively liquid foam generating substance is poured into the tubes placed horizontally, and given that the pressure applied by the foaming substance may reach 5 bars.

The present system allows for the use of straight, insulated sections. These straight sections include, at each end, an internal pipe 1 which extends beyond the external pipe 2 and beyond the insulating foam 3, as shown in FIG. 5, as well as one extended end of the electric wire 4.

The coupling of two insulated sections is obtained as follows.

Figure 5:
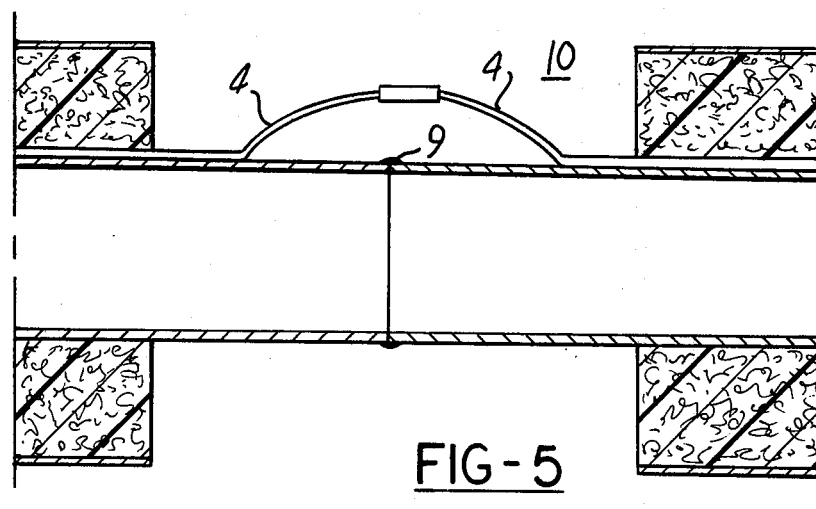
FIGS. 5 and 6 are two longitudinal cross-sectional views showing the coupling between two insulated piping portions.
Figure 6:
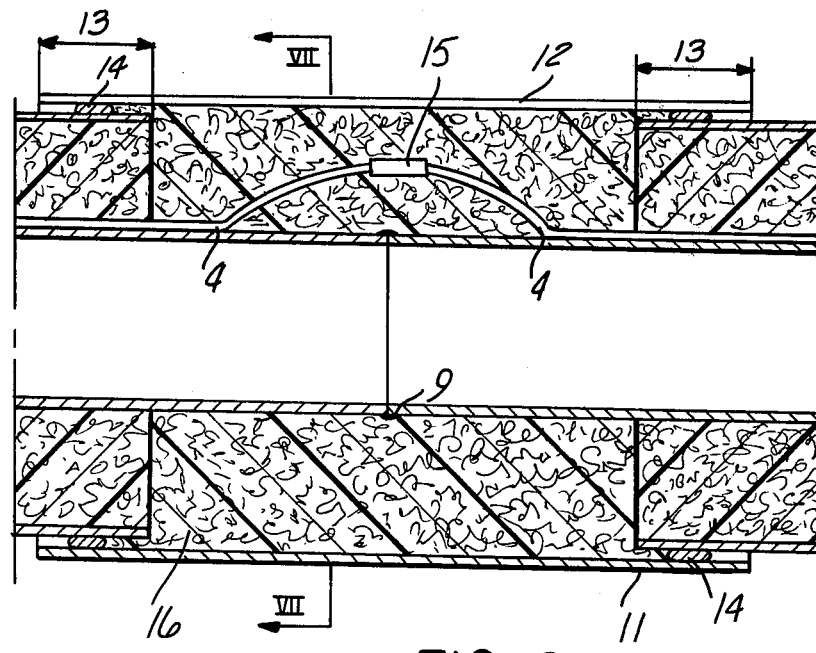
Figure 7:
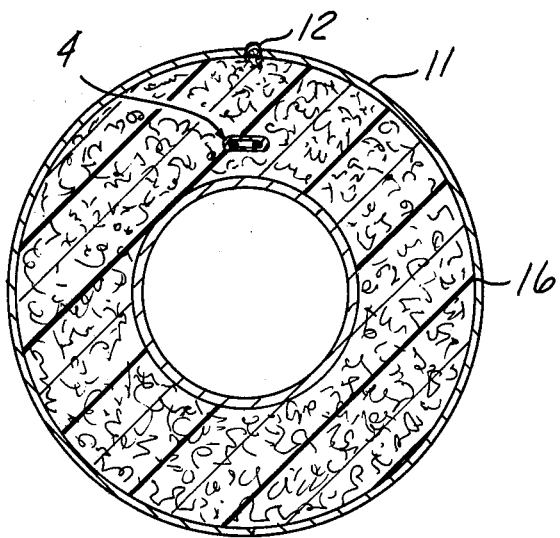
FIG. 7 is a cross-sectional view along lines VII—VII of FIG. 6.

The internal pipes 1 of both sections are directly butt welded, as shown in FIG. 5, to form a welding joint 9 which may take any suitable shape dependant upon the pipe material. The electric wires 4 are connected together by means of an electric connection 15. The space 10 separating the two insulated pipe portions is then covered with a plastic sleeve 11, as shown in FIGS. 6 and 7. This sleeve 11 includes a longitudinal slot 12 which may be widened so as to allow for the installation of the sleeve through a temporary elastic distortion of the sleeve assembly. The length of the sleeve 11 is such that each one of its ends covers or overcaps a small portion 13 of the external pipe 2 which has an insulated section. It is possible to place a strip of seals, 14 made of butyl rubber for instance, between the sleeve 11 and the external pipes 2. Finally, an epoxy resin foaming substance is injected through the slot 12 and inside the sleeve 11. While the masses of insulating foam 3 were previously obtained in prior art systems by using a foam whose physical polymerization involved two elements including a Freon gas as foaming agent, and a chemical polymerization, the two element type foam is now used and includes a chemical foaming agent. This foam is obtained from a very fluid substance which is highly adhesive and has a very slow reaction time. This substance flows through all pores so as to wet the ends of foam masses 3. In this case, again, the mixing of the elements is sufficient to cause the expansion and polymerization of the foam.

The resultant foam 16 has a high density, from 180 to 600 kg/m$^3$ approximately, whereas the density of the foam mass 3 is in the vicinity of 50 to 100 kg/m$^3$. This foam acts as a plug and prevents any leaks occuring in one of the insulated sections from spreading to the next one.

This type of connection may be used with all types of straight and elbow couplings.

It should be noted that the prior art systems using a polyurethane foam are subject to the shrinkage of a heat shrinkable sleeve surrounding a series of shells made of prefabricated foam, or even the prior art systems which consist of the injection of a foam generating substance inside a heavy steel saddle, did not provide such a tightness and requires an expensive and complicated handling system.

In order to improve the tightness of the assembly, it is also possible to pour some epoxy glue into the slot of the coupling sleeve, so as to provide a good surface tightness at this place.

The invented system offers the following advantages:

It offers an insulating rate that is approximately 50% higher than that obtained with polyurethane foam, and 100% higher than that of fiberglass. It may be used at high temperature, up to 160° and 170° C. in some cases. Being damp-proof, the epoxy foam will not react with water or humidity. There is no corrosion of the support and, in fact, the epoxy foam which sticks very strongly to the support increases the protection of the latter by acting as a paint. From a mechanical point of view, the epoxy foam is highly resistant. It is, for instance, 20% more resistant than the polyurethane foam. The closed cell epoxy foam is rot-proof, thus a long life of the insulated conduits is expected. This life duration is estimated to be at least 30 years.

While the invention has been described in connection with a preferred embodiment and method, it will be understood that it is not intended to limit the invention to that embodiment and method. On the contrary, it is intended to cover all alternatives, modifications and equivalents as may be included within the spirit and scope of the invention as defined by the appended claims.

What is claimed is:

1. A method of forming an insulating pipe comprising:
   mounting a wire heater along the periphery of an internal pipe;

surrounding said internal pipe with a larger diameter external pipe to form a tubular space between said internal pipe and said external pipe, whereby said wire heater is disposed in said tubular space; and introducing an insulating epoxy foam in said tubular space.

2. A method as claimed in claim 1 wherein said internal pipe is centrally disposed in said external pipe.

3. A method as claimed in claim 1 further comprising before the introducing step:

tilting said internal and external pipes.

4. A method as claimed in claim 3 wherein during said introducing step, said insulating epoxy foam is injected from the bottom of said tubular space.

5. A method as claimed in claim 2 further comprising before said surrounding step:

placing at least one radial spacer on the periphery of the internal pipe.

6. A method of connecting two internal pipes, each of said two internal pipes having an insulated section and at least one adjacent uninsulated end section, each of said insulated sections having an external pipe associated therewith, whereby each of said end sections extends beyond the end of each of said associated external pipes, and each of said internal pipes having a heater element along the periphery thereof, said heater elements each having a free end attachable to the free end of another heater element; said method comprising the steps of:

sealingly joining said uninsulated end sections of one of said two internal pipes to said uninsulated end sections of the other of said internal pipes thereby joining said two internal pipes;

connecting the free end of each of said heater elements on said joined internal pipes to one another;

connecting said insulated section of one of said two internal pipes to said insulated section of the other of said two internal pipes with a plastic sleeve such that said internal pipes extend beyond each of said external pipes and each of said insulated sections, said plastic sleeve partially covering each of said external pipes and having a longitudinal slot therebetween, said plastic sleeve further overlapping each of said external pipes; and introducing epoxy resin foam inside said sleeve.

7. A method as claimed in claim 6 further comprising after the introducing step:

injecting inert gas into said epoxy resin foam to nucleate the foam and further reduce its density;

circulating hot water in said internal pipe; and heating said internal pipe to avoid a skinning reaction of said epoxy resin foam.

8. A method as claimed in claim 1 wherein said external pipe is concentrically mounted with said internal pipe.

9. A method as claimed in claim 6 wherein each of said external pipes are concentrically mounted with each of said internal pipes.

* * * * *

UNITED STATES PATENT AND TRADEMARK OFFICE
CERTIFICATE OF CORRECTION

PATENT NO. : 4,384,905
DATED : May 24, 1983
INVENTOR(S) : Rene Gros

It is certified that error appears in the above-identified patent and that said Letters Patent is hereby corrected as shown below:

Column 1, line 33, delete "dant" and insert ---- dent ----.

Column 1, line 43, delete "is" and insert ---- are ----.

Column 1, line 43, delete "it is" and insert ---- are ----.

Column 1, line 50, delete "specifications" and insert ---- specification ----.

Column 1, line 54, delete "said".

Column 2, line 36, after "is" insert ---- a ----.

Column 2, line 47, delete "on" and insert ---- in ----.

Column 2, line 52, before "plastic" insert ---- a ----.

Column 2, line 54, delete "Pipe 1" and insert ---- The pipe 1 ----.

Column 2, line 54, after "whereas" insert ---- the ----.

UNITED STATES PATENT AND TRADEMARK OFFICE
CERTIFICATE OF CORRECTION

PATENT NO. : 4,384,905

DATED : May 24, 1983

INVENTOR(S) : Rene Gros

Page 2 of 2

It is certified that error appears in the above-identified patent and that said Letters Patent is hereby corrected as shown below:

Column 2, line 58, after "of" insert ---- the ----.

Column 3, line 7, after "around" insert ---- the ----.

Column 3, line 62, delete "dependant" and insert ---- dependent ----.

Column 4, line 1, after "sleeve" insert ---- 11 ----.

Column 4, line 12, after "as" insert ---- a ----.

Column 4, line 17, after "of" insert ---- the ----.

*Signed and Sealed this*

*Twenty-seventh* Day of *December 1983*

[SEAL]

Attest:

GERALD J. MOSSINGHOFF

*Attesting Officer*  *Commissioner of Patents and Trademarks*